(12) United States Patent
Mejdrich et al.

(10) Patent No.: US 8,275,821 B2
(45) Date of Patent: Sep. 25, 2012

(54) AREA EFFICIENT TRANSCENDENTAL ESTIMATE ALGORITHM

(75) Inventors: Eric Oliver Mejdrich, Rochester, MN (US); Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1267 days.

(21) Appl. No.: 11/851,658

(22) Filed: Sep. 7, 2007

(65) Prior Publication Data
US 2009/0070398 A1 Mar. 12, 2009

(51) Int. Cl.
*G06F 7/38* (2006.01)
*G06F 1/02* (2006.01)

(52) U.S. Cl. .......................... 708/440; 708/276; 708/277

(58) Field of Classification Search ................... 708/270, 708/276–277, 440
See application file for complete search history.

(56) References Cited

U.S. PATENT DOCUMENTS

| | | | |
|---|---|---|---|
| 6,178,435 B1 * | 1/2001 | Schmookler | 708/277 |
| 7,143,126 B2 * | 11/2006 | Fossum et al. | 708/277 |
| 7,225,323 B2 * | 5/2007 | Siu et al. | 712/222 |
| 7,912,883 B2 * | 3/2011 | Hussain | 708/277 |
| 2008/0183783 A1 * | 7/2008 | Tubbs | 708/209 |

OTHER PUBLICATIONS

Pedersen, Flemming; "Fast Sine/Cosine Assembler Subroutine for Phase Rotation"; http://pedersen.web.cern.ch/pedersen/project-leir-dsp-bc/matlab/fast_sine_cosine/fast_sine_cosine.doc.*
Wheeler, R. C., "Fast Sine-Cosine Subroutine (Floating Point)," RECOMP Users' Library at Autonetics Industrial Products, 1961.*
M. Payne and R. Hanek, "Radian Reduction for Trigonometric Functions," SIGNUM Newsletter, vol. 18, pp. 19-24, 1983.*
J. G. Ganssle, "A Guide to Approximation," http://www.ganssle.com/approx/approx.pdf, 2001.*

* cited by examiner

*Primary Examiner* — Chat Do
*Assistant Examiner* — Matthew Sandifer
(74) *Attorney, Agent, or Firm* — Patterson & Sheridan, LLP

(57) ABSTRACT

A method, computer-readable medium, and an apparatus for generating a transcendental value. The method includes receiving an input containing an input value and an opcode and determining whether the opcode corresponds to a trigonometric operation or a power-of-two operation. The method also includes calculating a fractional value and an integer value from the input value, generating the transcendental value based on the fractional value by adding at least a portion of the fractional value with at least one of a shifted fractional value produced by shifting the portion of the fractional value and a constant value, and providing the transcendental value in response to the request. In this fashion, the same circuit area may be used to carry out both trigonometric and power-of-two calculations, leading to greater circuit area savings and performance advantages while not sacrificing significant accuracy.

19 Claims, 9 Drawing Sheets

US 8,275,821 B2

AREA EFFICIENT TRANSCENDENTAL ESTIMATE ALGORITHM

BACKGROUND OF THE INVENTION

1. Field of the Invention

The present invention generally relates to performing calculations in a processor.

2. Description of the Related Art

Modern computer systems are typically capable of executing a wide variety of programs which perform various calculations at high speed. For example, a computer system may be configured to execute a video game in which a series of three-dimensional images (frames) is rapidly generated in a process referred to as rendering. The frames may then be displayed one after the other in quick succession, thereby producing an impression of motion. The video game may also be configured to perform physics simulations to simulate the result of actions being performed by a player of the video game.

Some of the computations performed during rendering may include mathematical functions that are not algebraic (such functions are commonly referred to as "transcendental functions"). For example, trigonometric, logarithm and exponentiation calculations may be performed during shading operations to determine an angle at which light from a light source reflects off of a surface. Transcendental calculations may also be performed where the video game performs physics simulations such as simulations of physical collisions between two objects. Such transcendental calculations may also be performed by other programs in addition to video games, such as rendering or graphics programs.

A common method for computing exponential and logarithmic functions in a computer system includes implementing floating point estimation algorithms. One method for floating point trigonometric estimation relies on software-based table lookup library functions, or hardware based table lookup functions. Software lookup methods involve having pre-generated Sine and Cosine table loaded into system memory. Since this method is software-based and the table is in memory, performance can be very slow when compared to other methods. A hardware-based solution may have table lookup logic circuitry in a simple programmable logic array (PLA) implementation or bipartite table implementation. These solutions for trigonometric functions are significantly faster than software based solutions, but consume substantial circuit area and may have performance disadvantages.

Accordingly, what is needed are an improved method, computer-readable medium, and apparatus for generating results of transcendental calculations in a manner that is more efficient relative to prior art approaches.

SUMMARY OF THE INVENTION

One embodiment provides a method for generating a transcendental value. The method generally includes receiving an input containing an input value and an opcode, determining whether the opcode corresponds to a trigonometric operation or a power-of-two operation, calculating a fractional value and an integer value from the input value, generating the transcendental value based on the integer value and the fractional value by adding at least a portion of the fractional value with at least one of a shifted fractional value produced by shifting the portion of the fractional value and a constant value, and providing the transcendental value in response to the request.

One embodiment provides a circuit for generating a transcendental value. The circuit generally includes determining whether the opcode corresponds to a trigonometric operation or a power-of-two operation, logic for calculating a fractional value and an integer value from an input value provided in an instruction, and logic for generating the transcendental value based on the integer value and the fractional value by adding at least a portion of the fractional value with at least one of a shifted fractional value produced by shifting the portion of the fractional value and a constant value.

One embodiment provides a processor. The processor generally includes at least one execution unit having logic for calculating a fractional value and an integer value from an input value provided in an instruction and logic for generating the transcendental value based on the integer value and the fractional value by adding at least a portion of the fractional value with at least one of a shifted fractional value produced by shifting the portion of the fractional value and a constant value.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
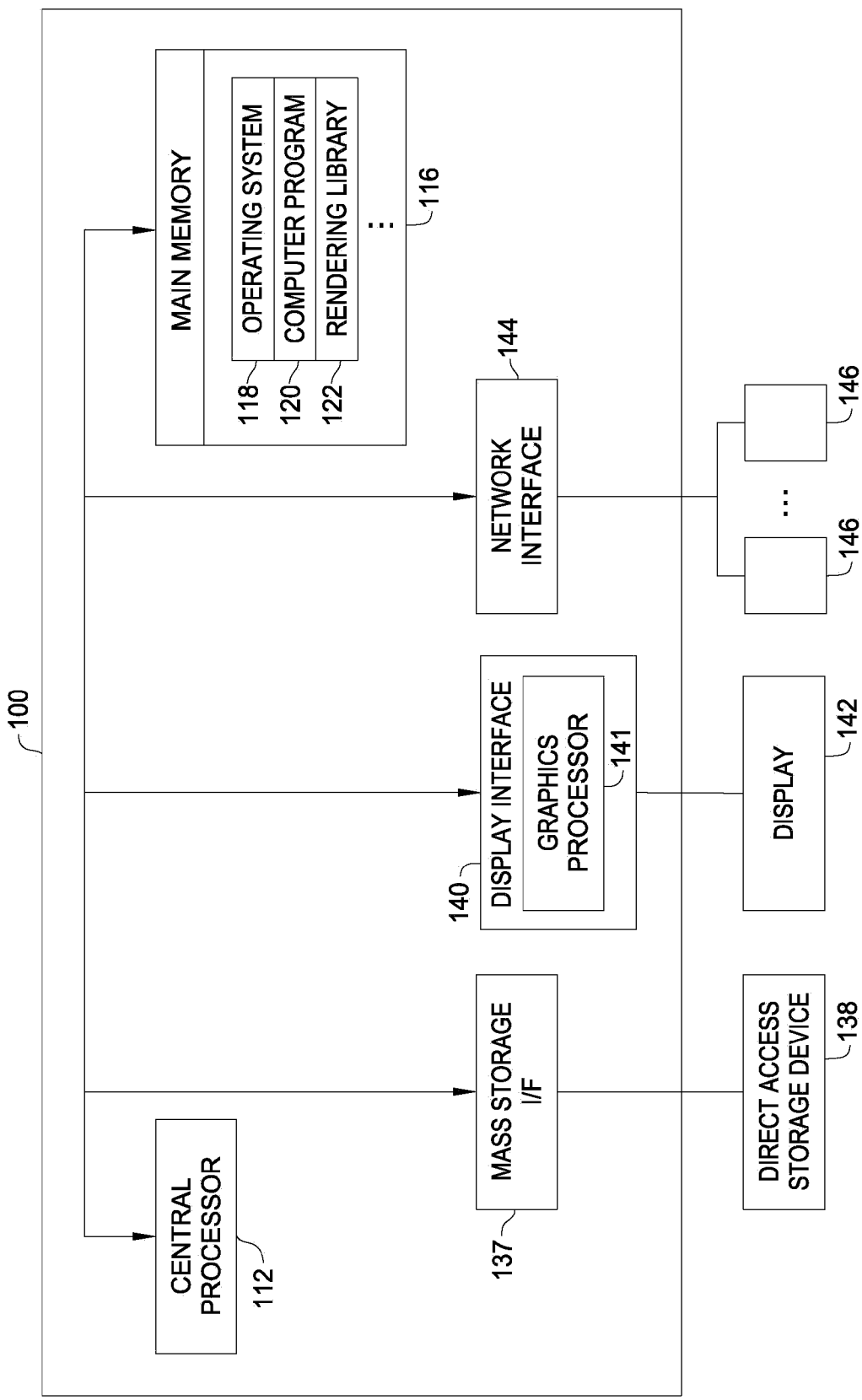
FIG. 1 is a block diagram depicting a computer system according to one embodiment of the invention.

Certain implementations of power-of-two floating point estimate algorithms contain a substantial amount of circuit logic that can be used in a novel manner to provide functionality to assist in the production of sine and cosine estimation functions. In previous implementations of the power-of-two estimation function, significant circuit area would go unused during pipeline stages when a power-of-two instructions was not being executed. The present invention generally provides a method, computer-readable medium, and apparatus for generating a transcendental value. In one embodiment, the method includes using a unique table and leveraging the existing circuit area of the power-of-two estimation function to achieve greater circuit area savings and performance advantages while not sacrificing significant accuracy.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

System Overview

A particular system for implementing the present embodiments is described with reference to FIG. 1. However, those skilled in the art will appreciate that embodiments may be practiced with any variety of computer system configurations including hand-held devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

FIG. 1 depicts a computer system 100 according to one embodiment of the present invention. For purposes of the invention, computer system 100 may represent any type of computer, computer system or other programmable electronic device, including a client computer, a server computer, a portable computer, an embedded controller, a video game console, etc. The computer system 100 may be a standalone device or networked into a larger system.

The computer system 100 may include a mass storage interface (I/F) 137 operably connected to a direct access storage device 138, a display interface 140 operably connected to a display 142, and a network interface 144 operably connected to a plurality of networked devices 146. The display interface 140 may include a graphics processor 141. The display 142 may be any video output device for outputting a user interface. The networked devices 146 could be desktop or PC-based computers, workstations, network terminals, or other networked computer systems. The computer system 100 may also include at least one central processor 112, which obtains instructions, or operation codes (also known as opcodes) and data via a bus 114 from a main memory 116. The processor 112 could be any processor adapted to support the methods, apparatus and article of manufacture of the invention.

The main memory 116 could be one or a combination of memory devices, including Random Access Memory, non-volatile or backup memory (e.g., programmable or Flash memories, read-only memories, etc.). In addition, memory 116 may be considered to include memory physically located elsewhere in a computer system 100, for example, any storage capacity used as virtual memory or stored on a mass storage device or on another computer coupled to the computer system 100 via bus 114. The main memory 116 may include an operating system 118, a computer program 120, and a rendering library 122 which may be used to render graphics and perform other calculations for the computer program 120.

Figure 2:
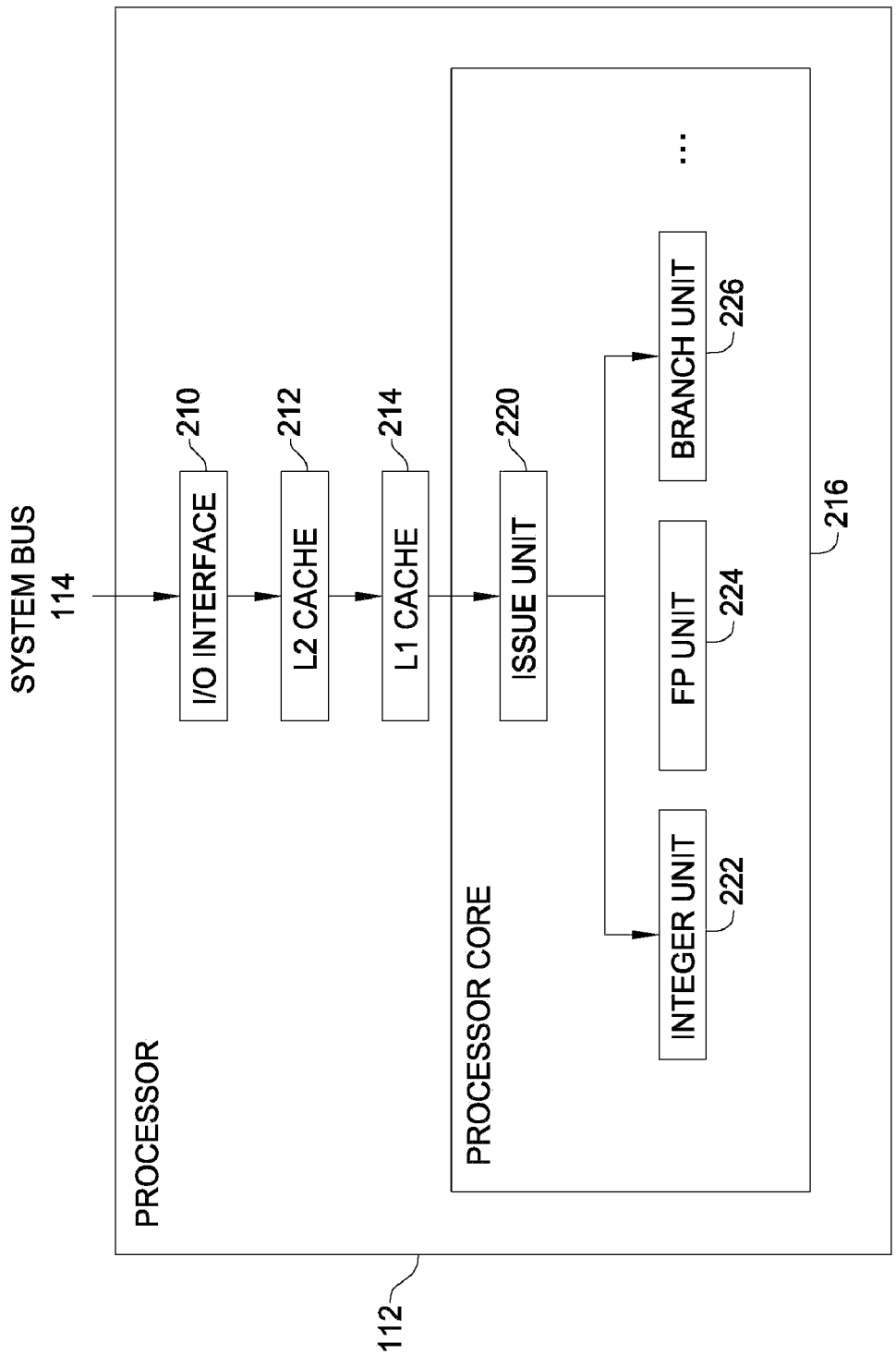
FIG. 2 is a block diagram depicting a processor according to one embodiment of the invention.

FIG. 2 is a block diagram depicting a processor 112 according to one embodiment of the invention. The processor 112 may include an input/output (I/O) interface 210 which sends and receives data via the system bus 114. The processor 112 may store a portion of the data being used by programs executed by the processor 112 in an L1 cache 214 and/or an L2 cache 212. Instructions executed by the processor 112 may be executed in a processor core 216 which may include an issue unit 220 for issuing instructions, an integer unit 222 for performing integer calculations, a floating point (FP) unit 224 for performing floating point calculations, a branch unit 226 for executing branch instructions, as well as other execution units. While described herein with respect to a single central processor 112 with a single processor core 216, embodiments of the invention may be utilized with any number of processors having one, two, or more processor cores 216.

Using Transcendental Estimate Addend Production Logic to Generate Trigonometric and Power-of-Two Values Embodiments of the invention provide a method, computer-readable medium, and apparatus for generating a transcendental value, for example, for a trigonometric calculation operation or a power-of-two calculation operation. As described below, embodiments may generate either trigonometric or power-of-two values by estimating the values based on a received input using a transcendental estimate addend production logic. In one embodiment, by performing the estimations as described below, the transcendental value may be obtained more quickly than other slower software methods for generating the transcendental value and with less hardware overhead than processors which utilize large lookup tables to generate the transcendental value.

In one embodiment, generating an estimated transcendental value may be used by programs (e.g., program 120 and/or rendering library 122) in which obtaining the trigonometric and power-of-two values quickly is desired and where increased accuracy is optional. For example, embodiments of the invention may be used for fast rendering operations in programs such as video games. During the rendering operations, the estimated transcendental value may be used for pixel shading, vertex shading, and/or generating procedural textures. Results of the rendering operations may then be displayed to a user, for example, using display 142. During such operations, any difference between the estimated transcendental value and a value with increased accuracy may remain unnoticeable to the human eye. However, it is noted that embodiments of the invention may be used as an alternative to and/or in addition to slower software methods and hardware methods which utilize large lookup tables to produce transcendental values of increased and/or decreased accuracy. Furthermore, embodiments of the invention may be utilized with any type of integrated circuit including the central processor 112 and/or the graphics processor 141 described above.

Generating a Trigonometric Value

Figure 3:
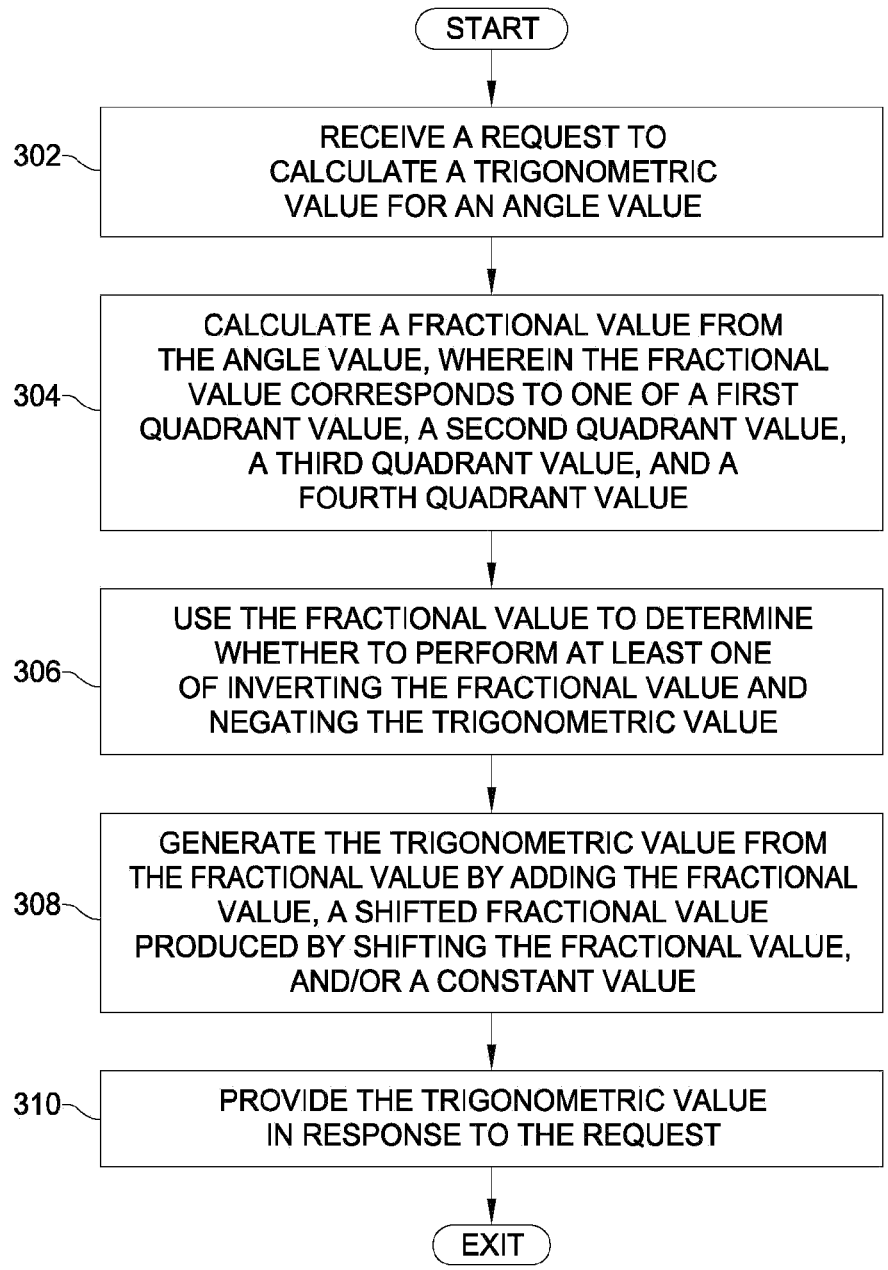
FIGS. 3 and 4A-B are flow diagrams depicting processes for generating a trigonometric value according to one embodiment of the invention.

FIG. 3 is a block diagram depicting a process 300 for generating a trigonometric value according to one embodiment of the invention. As depicted, the process 300 may begin at step 302 where a request to calculate a trigonometric value for an angle value is received. For example, the request may be an instruction executed by the processor 112 as part of the computer program 120 or rendering library 122. The instruction may include, for example, a sine calculation instruction for the angle value or a cosine calculation instruction for the angle value.

Figure 5:
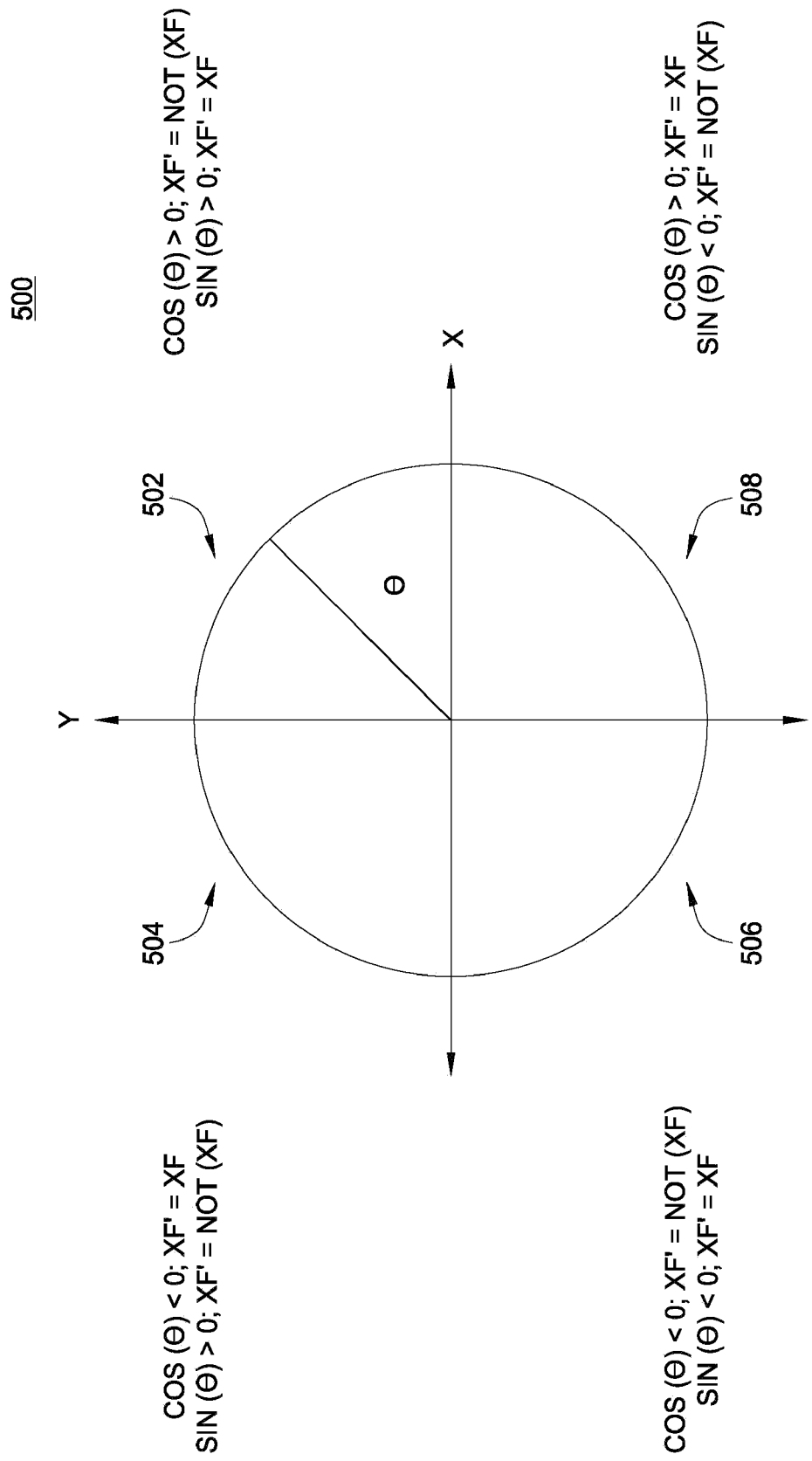
FIG. 5 is a block diagram depicting a unit circle according to one embodiment of the invention.

At step 304 a fractional value may be calculated from the angle value. The fractional value may correspond to one of a first quadrant value, a second quadrant value, a third quadrant value, and a fourth quadrant value. For example, as depicted in FIG. 5, the fractional value may correspond to one quadrant 502, 504, 506, 508 of a unit circle 500. As used herein, the terms first quadrant, second quadrant, third quadrant, and fourth quadrant are merely nominal, and may refer to any one quadrant of the unit circle 500. In one embodiment, if the received angle value ($\theta$) is in radians, the angle value may be divided by a constant value of two multiplied by pi ($\theta/2\pi$, or, equivalently, the angle value may be multiplied by a constant value of ½PI). Optionally, if the received angle value is in degrees, the angle value may be divided by a constant value of 360 degrees (or, equivalently, the angle value may be multiplied by a constant value of 1/360). In either case, the result of the division may include an integer value (e.g., if the angle value is greater than $2\pi$ radians or 360 degrees) and the fractional value which indicates a quadrant of the unit circle in which the angle value lies.

At step 306, the fraction value may be used to determine whether perform at least one of inverting the fractional value and negating the trigonometric value. For example, as depicted in FIG. 5, if the fractional value (XF) falls in the first quadrant 502 and the operation being performed is a cosine operation, then the resulting trigonometric value may be positive ($COS(\theta)>0$) and the fractional value may be inverted (XF'=NOT(XF)). As another example, if the operation being performed is a sine operation and the fractional value falls in the third quadrant 506, the resulting trigonometric value may be negative ($SIN(\theta)<0$) and the fractional value may not be inverted (XF'=XF). In one embodiment, negating the trigonometric value may be performed by setting the sign bit of the trigonometric value after the trigonometric value has been generated as described below.

At step 308, the trigonometric value may be generated from the fractional value by adding the fractional value, a shifted fractional value produced by shifting the fractional value, and/or a constant value. The shifted fractional value may also be inverted before addition or may be added after shifting without inversion. As described below, a portion of the fractional value may be used to indicate whether to add the shifted fractional value and/or a given constant value to obtain an approximation of the correct result of the trigonometric operation being performed. In some cases, to improve to the approximation provided by the generated trigonometric value, additional shifted fractional values may also be added to generate the trigonometric value. At step 310, the trigonometric value may be provided in response to the request. As described above, the trigonometric value may be used, for example, during rendering operations for pixel shading, vertex shading, and/or generating procedural textures. The trigonometric value may also be used to perform physics calculations. Results of the rendering operations and/or physics calculations may then be displayed as a rendered image to a user, for example, using display 142.

Figure 4A:
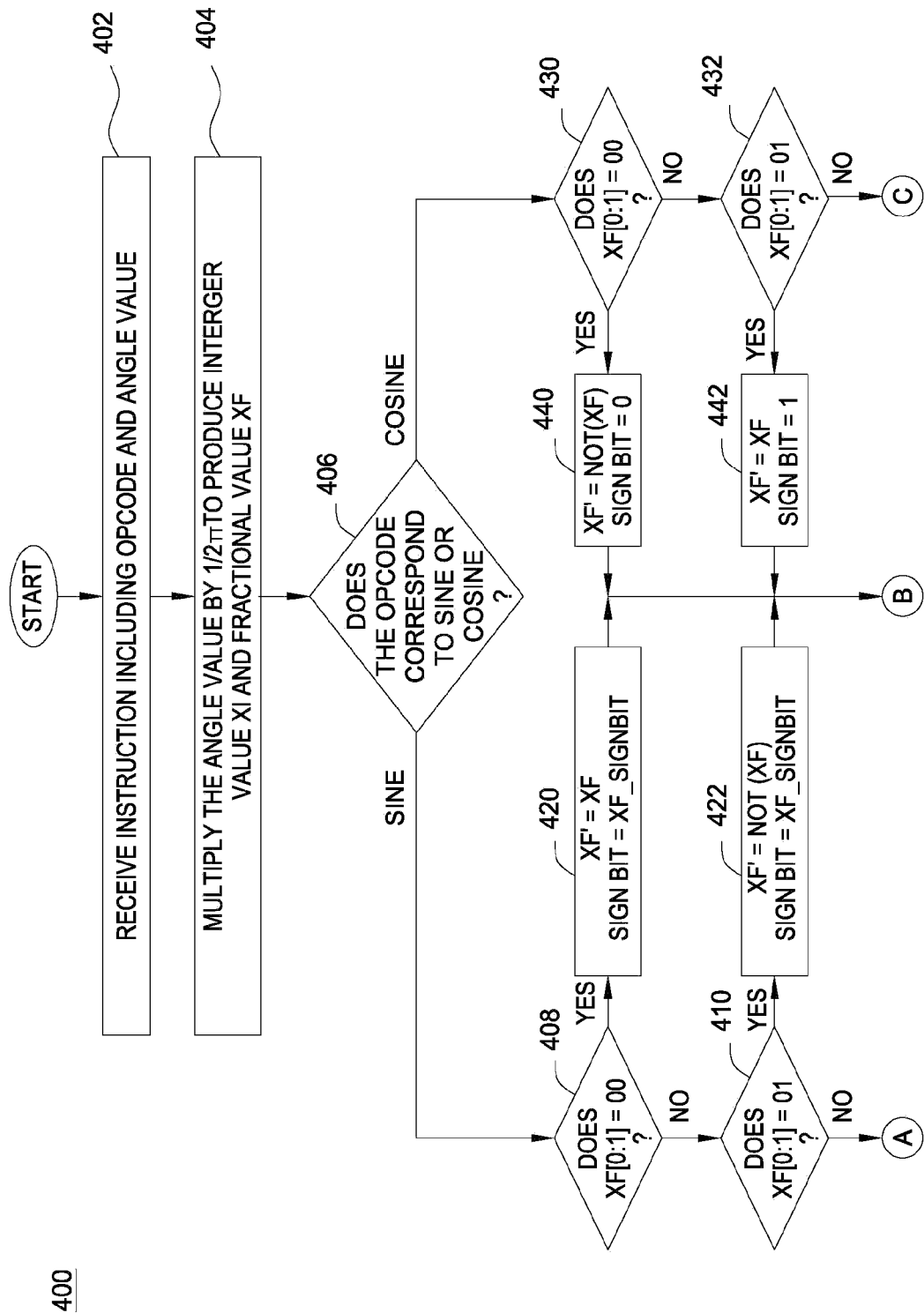
Figure 4B:
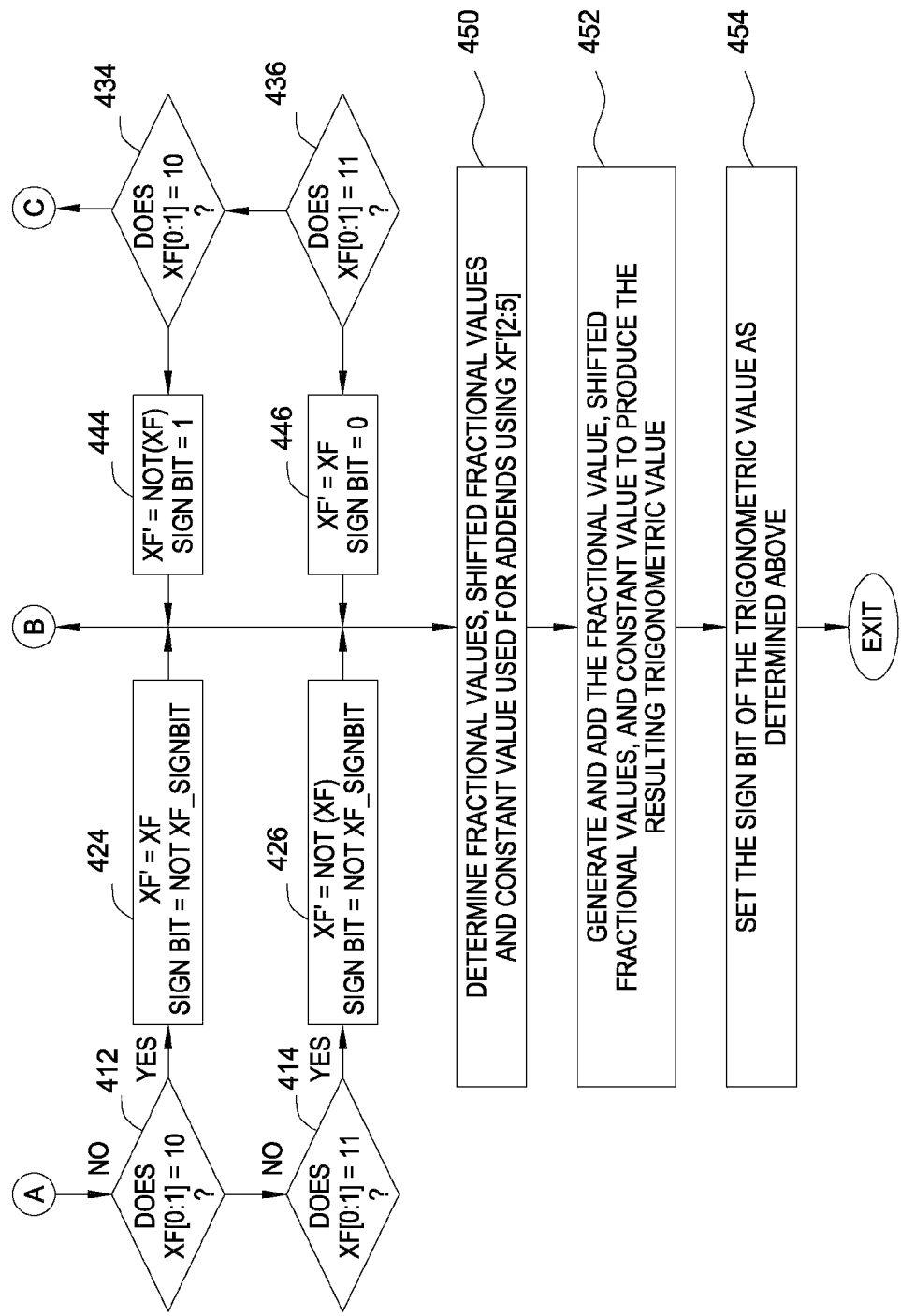

In general, the steps described above with respect to FIG. 3 for generating the trigonometric value may be performed in any appropriate order and with any desired accuracy (e.g., in the number of bits of the angle value, fractional value, and trigonometric value). For example, FIGS. 4A-B are flow diagrams depicting a process 400 for generating the trigonometric value according to one embodiment of the invention. When compared with completely accurate results of the trigonometric operation being performed (e.g., generated using much slower and computational-intensive methods or larger, more expensive hardware lookup tables), the method 400 described below may provide an absolute error of less than 1/128.

In one embodiment, the method 400 begins at step 402 where an instruction including an opcode and an angle value is received. At step 404, the angle value may be multiplied by a constant value of ½PI. After multiplication by ½PI, the angle value is shifted based on its exponent to produce an integer value XI and a fractional value XF. As described above, the fractional value may correspond to one of the quadrants 502, 504, 506, 508 of the unit circle 500. In one embodiment, the fractional value XF may be a 12-bit binary number, XF[0:11] with a separate sign bit.

At step 406, a determination may be made of whether the opcode corresponds to a sine operation or cosine operation. As described above with respect to FIG. 5, and as depicted below in Table 1, the type of trigonometric operation may be used to determine whether to invert the fractional value XF (thereby producing XF') and also to determine the sign bit for the generated trigonometric value.

TABLE 1

Determining Inversion of XF and Sign Bit of Result

| Operand | XF[0:1] | Quadrant | XF' | Sign Bit |
|---|---|---|---|---|
| Sine | 00 | ($0 \leq \theta < \pi/2$) | XF | XF_Signbit |
| Sine | 01 | ($\pi/2 \leq \theta < \pi$) | NOT(XF) | XF_Signbit |
| Sine | 10 | ($\pi \leq \theta < 3\pi/2$) | XF | NOT XF_Signbit |
| Sine | 11 | ($3\pi/2 \leq \theta < 2\pi$) | NOT(XF) | NOT XF_Signbit |
| Cosine | 00 | ($0 \leq \theta < \pi/2$) | NOT(XF) | 0 |
| Cosine | 01 | ($\pi/2 \leq \theta < \pi$) | XF | 1 |
| Cosine | 10 | ($\pi \leq \theta < 3\pi/2$) | NOT(XF) | 1 |
| Cosine | 11 | ($3\pi/2 \leq \theta < 2\pi$) | XF | 0 |

In one embodiment, the first two bits of the fractional value XF[0:1] may be used to determine which quadrant the angle value is in. Thus, by examining both the type of opcode and the also first two bits of XF, a complete determination may be made of whether to invert XF and of the sign bit for the generated trigonometric value. Accordingly, as depicted with respect to steps 408-414 and steps 430-436 (for sine and cosine operations, respectively), XF[0:1] may be examined to determine which quadrant 502, 504, 506, 508 the angle value lies within. Then, at steps 420-426 and steps 440-446 (corresponding to the entries depicted above in Table 1), the fractional value XF may be inverted where indicated and the sign bit for the generated trigonometric value may be established.

As mentioned above, in one embodiment, the trigonometric value may be generated from the fractional value by adding the fractional value with at least one of a shifted fractional value produced by shifting the fractional value and a constant value. For example, as depicted in Table 2, a portion of the fractional value XF[2:5] may be examined to determine which ⅟₁₆ segment of the quadrant of the unit circle 500 the angle value lies within. Based on the determined segment, the appropriate addends for generating the trigonometric value may be established. In some cases, the selected addends may include a portion of the fractional value XF[2:11] (depicted under column ADD1), the portion of the fractional value XF[2:11] shifted to the right by one, two, three, or four bits (S1, S2, S3, S4, depicted under column ADD2), and a constant (depicted under the column ADD3). In some cases, as depicted by the caret symbol ("^", e.g., ^S1, ^S2, ^S3), the shifted fractional value may also be inverted before addition. Also, in some cases, as indicated by the blank entries in Table 2, fewer than three addends may be used to generate the trigonometric value.

TABLE 2

Determining the Addends for Generating the Result

| XF'[2:5] | ADD1 | ADD2 | ADD3 |
|---|---|---|---|
| 0000 | XF'[2:11] | S1 | 0000000010 |
| 0001 | XF'[2:11] | S1 | 0000000100 |
| 0010 | XF'[2:11] | S1 | 0000001000 |
| 0011 | XF'[2:11] | S1 | 0000001000 |
| 0100 | XF'[2:11] | S2 | 0001001111 |
| 0101 | XF'[2:11] | S2 | 0001010110 |
| 0110 | XF'[2:11] | S2 | 0001011000 |
| 0111 | XF'[2:11] | S3 | 0010010010 |
| 1000 | XF'[2:11] |  | 0011010010 |
| 1001 | XF'[2:11] | ^S3 | 0010100000 |
| 1010 | XF'[2:11] | ^S3 | 0010100000 |
| 1011 | XF'[2:11] | ^S2 | 0001110100 |
| 1100 | XF'[2:11] | ^S1 | 0000100000 |
| 1101 | XF'[2:11] | ^S1 | 0000110000 |
| 1110 |  | S4 | 1110111010 |
| 1111 |  | S4 | 1111000000 |

Accordingly, in one embodiment of the invention, XF'[2:5] may be used at step 450 to determine (as depicted above in Table 2) the fractional value (ADD1), if any, shifted fractional value (ADD2), if any, and the constant value (ADD3), if any, to be used as addends in generating the trigonometric value. Then, at step 452, the fractional value XF'[2:11], shifted fractional values (S1, S2, etc.), and/or the constant value may be generated and added to produce the trigonometric value. At step 454, the sign bit of the trigonometric value may be set as determined with respect to steps 420-426 and 440-446.

As an example, of the process 400 depicted in FIGS. 4A-B, the sine of π/4 (45 degrees) is approximately 0.70710678, which corresponds to approximately "0.10110101000001" in binary. If an instruction to calculate the sine of π/4 is received at step 402, then at step 404, the angle value π/4 may be multiplied by ½π to produce an integer value XI of zero and a fractional value of ⅛ (in binary, XF[0:13] =0.00100000000000). At step 406, a determination may be made the received opcode corresponds to a sine operation, and at step 408 a determination may be made that XF[0:1] is equal to "00". Accordingly, at step 420, it may be established that XF' should be equal to XF, and that the resulting sign bit should be 0. At step 450, the shifted fractional values and constant value may be determined as described above with respect to Table 2. Here, XF'[2:5] is "1000", so the addends are XF'[2:11] for ADD1, no addend for ADD2, and a constant value of "0011010010" for ADD3. At step 452, the addends may be added, in this case, producing the value "0.0011010010"+"0.100000000000"="0.101101001000". The sign bit may then be set as determined at step 420 to zero (e.g., the result is positive). In comparison with the approximate value provided above of "0.10110101000001, the difference is less than ⅟₁₂₈, thus providing at least seven bit accuracy.

Generating a Power-of-Two Value

Figure 6:
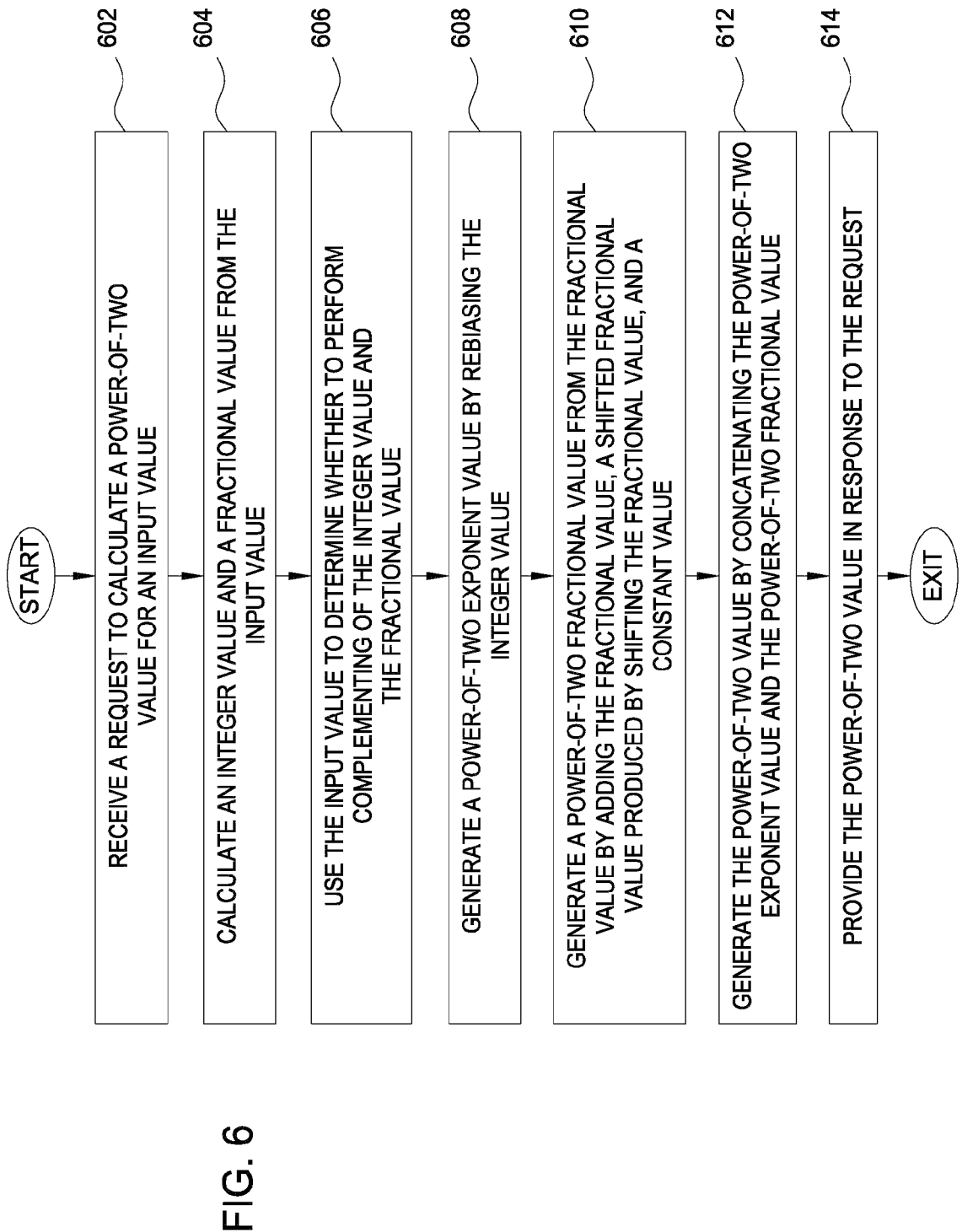
FIGS. 6 and 7 are flow diagrams depicting processes for generating a power-of-two value according to one embodiment of the invention.
Figure 7:
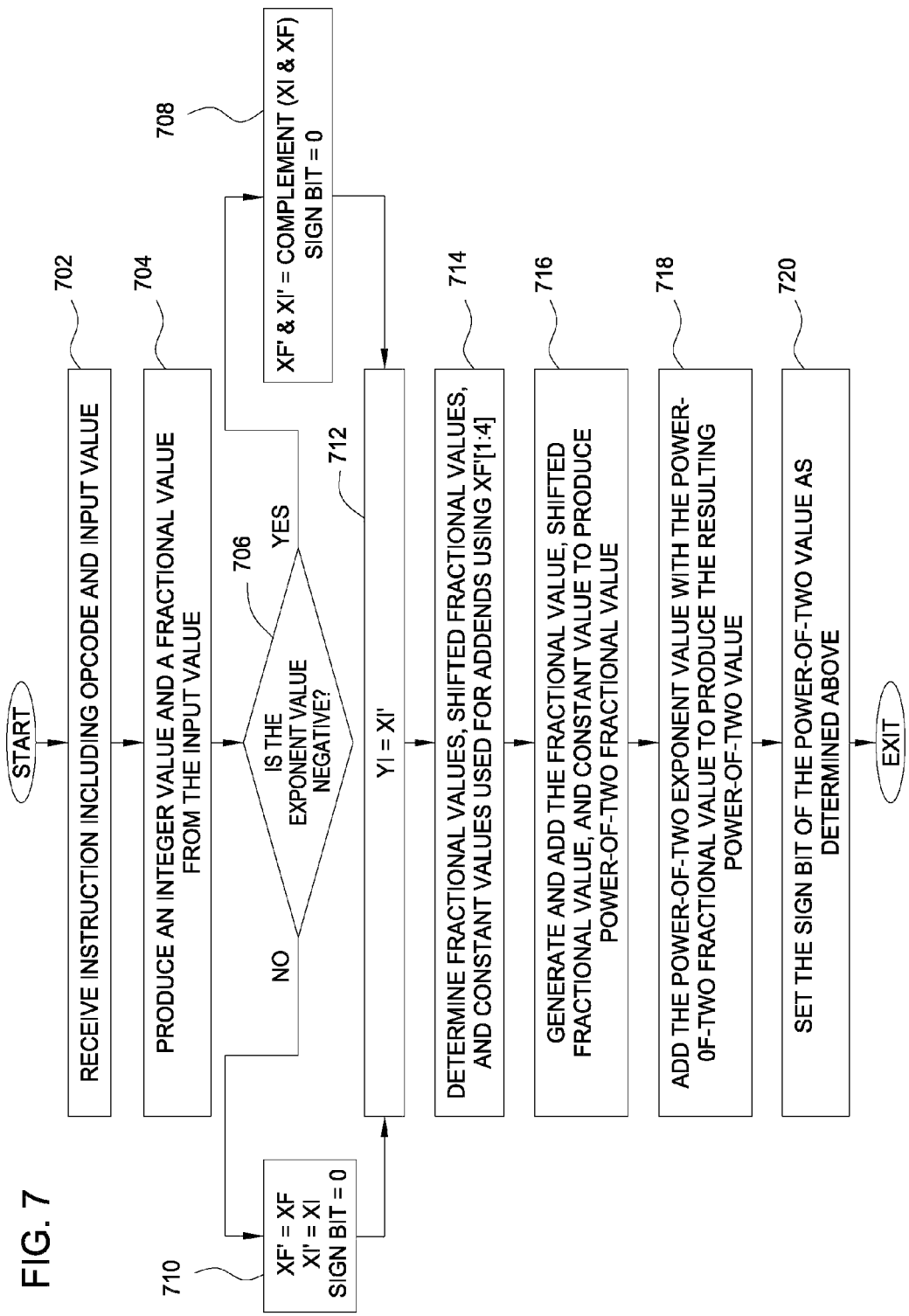

FIG. 6 is a block diagram depicting a process 600 for generating a power-of-two value according to one embodiment of the invention. Importantly, method steps described in FIGS. 6 and 7 are similar to those described in FIGS. 3 and 4A-B. Implementing similar steps to estimate trigonometric and power-of-two values allows using the same circuit area to implement the trigonometric and the power-of-two estimation algorithms. In turn, using the same circuit area to perform trigonometric and power-of-two calculations allows to achieve greater circuit area savings and performance advantages while not sacrificing significant accuracy.

As depicted, the process 600 may begin at step 602 where a request to calculate a power-of-two value for an input value is received. Again, the request may be an instruction executed by the processor 112 as part of the computer program 120 or rendering library 122.

At step 604 an integer and a fractional value may be calculated from the input value. At step 606, the input value may be used to determine whether to perform complementing of the integer value and the fractional value, described in greater detail in FIG. 7. At step 608, a power-of-two exponent value may be generated by re-biasing the integer value. In one embodiment, re-biasing may be performed by adding +127 in the case of single precision float.

At step 610, a power-of-two fractional value may be generated from the fractional value by adding the fractional value, a shifted fractional value produced by shifting the fractional value, and a constant value. The shifted fractional value may also be inverted before addition or may be added after shifting without inversion. As described herein, a portion of the fractional value may be used to indicate whether to add the shifted fractional value and/or a given constant value to obtain an approximation of the correct result of the power-of-two operation being performed. In some cases, to improve to the approximation provided by the generated power-of-two value, additional shifted fractional values may also be added to generate the power-of-two value.

At step 612, the power-of-two value may be generated by concatenating the power-of-two exponent value with the power-of-two fractional value. Finally, at step 614, the power-of-two value may be provided in response to the request. As described above, the power-of-two value may be used, for example, during rendering operations for pixel shading, vertex shading, and/or generating procedural textures. The power-of-two value may also be used to perform physics calculations. Results of the rendering operations and/or physics calculations may then be displayed as a rendered image to a user, for example, using display 142.

In general, the steps described above with respect to FIG. 6 for generating the power-of-two value may be performed in any appropriate order and with any desired accuracy (e.g., in the number of bits of the input value, fractional value, and power-of-two value). For example, FIG. 7 is a flow diagram depicting a process 700 for generating the power-of-two value according to one embodiment of the invention.

In one embodiment, the method begins at step 702, where an instruction including an opcode and an input value is received. At step 704, the floating point input value may be separated to produce an integer value XI and a fractional value XF. In one embodiment, the fractional value XF may be a 12-bit binary number, XF [0:11] with a separate sign bit.

At step 706, a determination may be made of whether the input value is negative. If this is the case, then, in step 708, the fractional value and the integer value are complemented and the sign bit assigned as zero. If the input value is not negative, then, in step 710, the fractional value and the integer value are not complemented, and the sign bit is assigned as zero. At step 712, the integer value is designated as a power-of-two exponent value.

As mentioned above, in one embodiment, the power-of-two value may be generated based on the fractional value by adding the fractional value with at least one of a shifted fractional value produced by shifting the fractional value and a constant value. For example, as depicted in Table 3, a portion of the fractional value XF[1:4] may be used to determine shifted fractional values and constant values used for addends. In some cases, the selected addends may include a portion of the fractional value XF[1:11] (depicted under column ADD1), the portion of the fractional value XF[1:11] shifter to the right by one, two, or three bits (S1, S2, S3 depicted under column ADD2), and a constant C[4:7] (depicted under the column ADD3). Similar to Table 2, in some cases, as depicted by the caret symbol ('^', e.g., ^S1, ^S2, ^S3), the shifted fractional value may also be inverted before addition.

TABLE 3

Determining the Addends for Generating the Result

| XF'[1:4] | ADD1 | ADD2 | ADD3 |
|---|---|---|---|
| 0000 | XF'[1:11] | S2 | 0000 |
| 0001 | XF'[1:11] | S2 | 0000 |
| 0010 | XF'[1:11] | S2 | 0000 |
| 0011 | XF'[1:11] | S2 | 0000 |
| 0100 | XF'[1:11] | S3 | 0100 |
| 0101 | XF'[1:11] | S3 | 0100 |
| 0110 | XF'[1:11] | S3 | 0100 |
| 0111 | XF'[1:11] | 0 | 1011 |

TABLE 3-continued

Determining the Addends for Generating the Result

| XF'[1:4] | ADD1 | ADD2 | ADD3 |
|---|---|---|---|
| 1000 | XF'[1:11] | 0 | 1011 |
| 1001 | XF'[1:11] | 0 | 1011 |
| 1010 | XF'[1:11] | ^S3 | 0101 |
| 1011 | XF'[1:11] | ^S3 | 0101 |
| 1100 | XF'[1:11] | ^S3 | 0101 |
| 1101 | XF'[1:11] | ^S2 | 0010 |
| 1110 | XF'[1:11] | ^S2 | 0010 |
| 1111 | XF'[1:11] | ^S1 | 0000 |

Accordingly, in one embodiment of the invention, XF'[1:4] may be used at step 714 to determine (as depicted above in Table 3) the fractional values (ADD1), if any, shifted fractional values (ADD2), if any, and the constant value C[4:7] (ADD3), if any, to be used as addends in generating the power-of-two value. Then, in step 716, the fractional value XF'[1:11], shifted fractional values (S1, S2, etc.), and/or the constant value may be generated and added to produce a power-of-two fractional value.

At step 718, the power-of-two exponent value is added with the power-of-two fractional value to produce the resulting power-of-two value. At step 720, the sign bit of the power-of-two value may be set as determined with respect to steps 708 and 710.

While the methods for calculating trigonometric and power-of-two estimates are described above with respect to providing seven bit accuracy, embodiments of the invention may be used to provide any desired amount of accuracy. For example, to increase the speed with which the computation is performed, the number of bits of accuracy may be reduced, for example, by reducing the number of segment entries XF' [2:5] depicted in Table 2 (e.g., the number of entries could be reduced to eight, using XF'[2:4] as a lookup) and the number of segment entries XF'[1:4] depicted in Table 3 (e.g., the number of entries could be reduced to eight, using XF'[1:3] as a lookup). Similarly, the number and size of the addends could be reduced, for example, by removing the addend column for ADD2 and/or by reducing the number of bits of the constant values used for ADD3. The accuracy of the computation may also be increased, for example, by making corresponding changes to Tables 2 and 3 for increased segment entries and increased accuracy of the addends.

In one embodiment of the invention, steps of the methods described above may be performed using any conventional processor. For example, each of the steps may be implemented using instructions executed by a conventional processor, with lookup values being stored in conventional processor memory and with determinations described above being performed by the executed instruction. Embodiments of the invention may also be utilized where one or more steps are performed using hardware circuitry designed specifically to carry out the one or more steps. Such hardware circuitry may be used, for example, in addition to conventional processor capabilities to generate the trigonometric or power-of-two values.

The methods described above may also be performed by a processor (e.g., central processor 112 or graphics processor 141) configured specifically to execute an instructions for performing the steps described above. For example, for trigonometric functions, the instructions may be referred to as SIN EFP and COS EFP because the instructions may produce an estimated floating point value for the sine and cosine of an angle value indicated by the instructions. In some cases, the instructions may also be executed as part of a vector calculation, for example, V SIN EFP and V COS EFP.

Implementing Transcendental Estimate Logic

Figure 8:
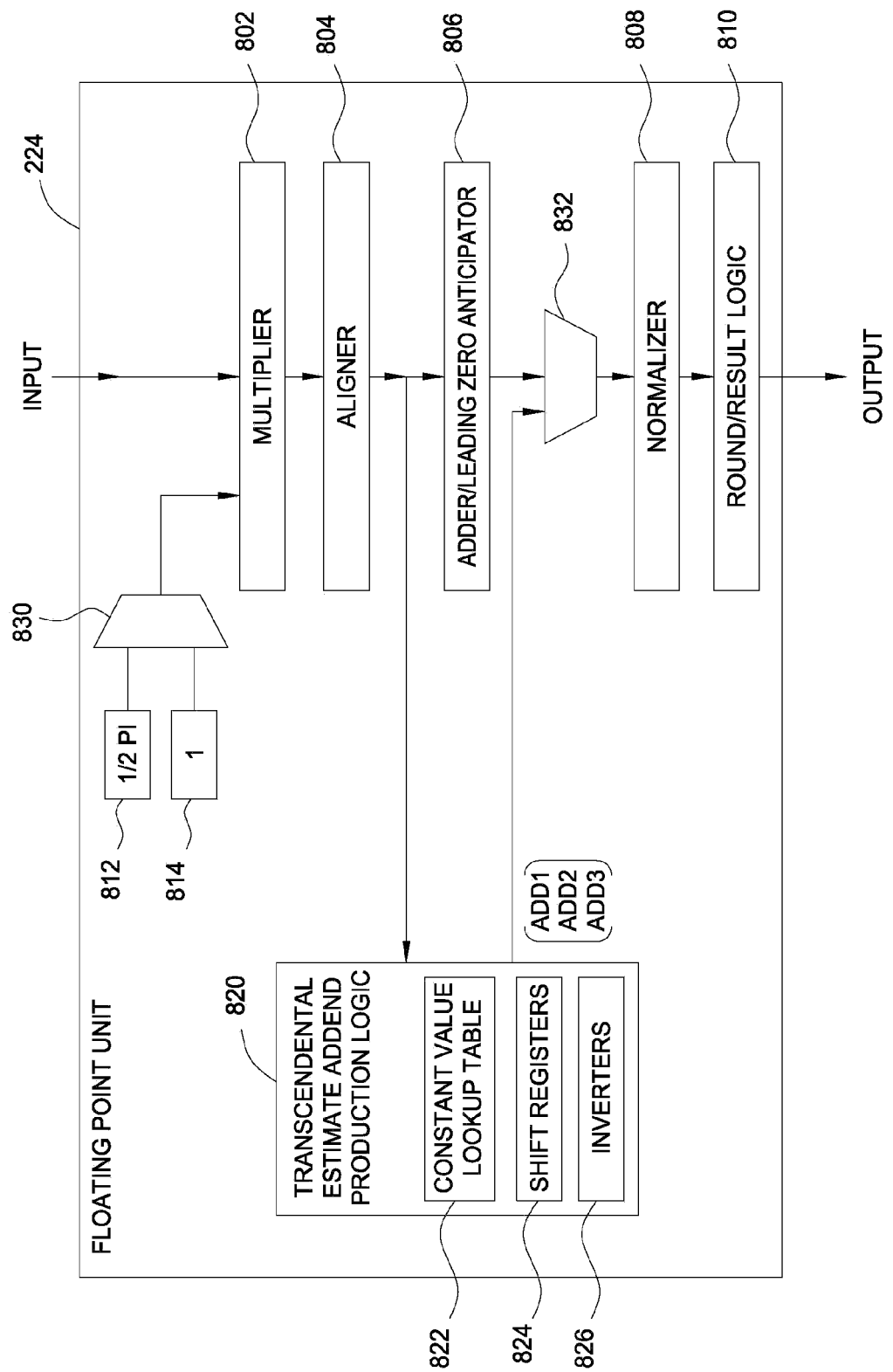
FIG. 8 is a block diagram depicting a floating point unit configured to generate transcendental values according to one embodiment of the invention.

In one embodiment of the invention, the pipeline for a floating point unit 224 may be modified to perform the steps described above in manner that provides increased execution performance with minimal additional hardware overhead. For example, FIG. 8 is a block diagram depicting a floating point unit 224 configured to generate transcendental values according to one embodiment of the invention. As depicted, the floating point unit 224 may include a multiplier 802, aligner 804, adder and leading zero anticipator 806, normalizer 808, and round and result logic 810. In one embodiment, the floating point unit 224 may also include logic configured to determine whether the input received by the floating point unit 224 includes an angle value and an opcode corresponding to a trigonometric operation or the input includes an exponent value and an opcode corresponding to a power-of-two operation. Depending on whether the opcode corresponds to the trigonometric or to the power-of-two operation, the floating point unit 224 then performs the steps described either in FIG. 3 or FIG. 6, respectively.

The multiplier 802 may be configured to multiply two floating point numbers. Thus, for example, for the trigonometric calculations, the multiplier 802 may be used to multiply the input angle value by a constant value 812 of ½PI, while for the power-of-two calculations, the multiplier 802 may be used to multiply the input exponent value by a constant value 814 of 1 thereby producing a floating point result of the multiplication. Optionally, instead of multiplying by ½PI or 1, the input may also be multiplied by another constant, thereby scaling the input and providing an additional multiplication in addition to generating the transcendental result. After the multiplication has been performed, the result of the multiplication may be sent to the aligner 804. The aligner 804 is configured to partition the result of the multiplication into an integer value XI and fractional value XF.

In one embodiment, as described above, the fractional value XF may be used to generate the transcendental result. For example, the fractional value XF may be provided to transcendental estimate addend production logic 820 which may be used to determine the addends (e.g., ADD1, ADD2, ADD3) according to the embodiments described above. For example, the transcendental estimate addend production logic 820 may use a constant value lookup table 822 to lookup the constant value addend ADD3. The transcendental estimate addend production logic 820 may also use shift registers 824 and inverters 826 to invert and/or shift the fractional value XF, thereby producing the addends ADD1, ADD2, ADD3 described above.

In one embodiment, the addition of the addends generated by the transcendental estimate addend production logic 820 may be performed with a transcendental adder 832 which adds the three addends and then uses the adder and leading zero anticipator 806 to add the final values. Optionally, the adder may be implemented separately in the transcendental estimate addend production logic 820, for example, to improve timing of the addition operation.

After the sum of the addends ADD1, ADD2, ADD3 is obtained, the sum may be sent to the normalizer 808 to be normalized into a correct floating point value, for example, using information from the adder and leading zero anticipator 806. The normalized sum may then be sent to the round and result logic 810 for any rounding and/or to force any special case constants (e.g., if the input is zero, then the round and result logic may output a one for a cosine function, a zero for a sine function, and a one for a power-of-two function). The transcendental result may then be provided as an output from the floating point unit 224, for example, to be used in other calculations. Thus, as described above, the transcendental value may be used, for example, during rendering operations for pixel shading, vertex shading, and/or generating procedural textures. The transcendental value may also be used to perform physics calculations. Results of the rendering operations and/or physics calculations may then be displayed as a rendered image to a user, for example, using display 142.

While the foregoing is directed to embodiments of the present invention, other and further embodiments of the invention may be devised without departing from the basic scope thereof, and the scope thereof is determined by the claims that follow.

What is claimed is:

1. A method for generating a transcendental value, comprising:
    receiving an input containing an input value and an opcode;
    determining, via one or more processors, whether the opcode corresponds to a trigonometric operation or a power-of-two operation;
    calculating, via the one or more processors, at least a fractional value from the input value;
    determining, via the one or more processors, at least one of a shifted fractional value and a constant value, wherein the constant value is determined based on at least a first portion of the fractional value, wherein the shifted fractional value is produced by shifting a second portion of the fractional value, wherein the second portion of the fractional value is different from the first portion of the fractional value, and wherein the first and second portions of the fractional value each include one or more, but not all, bits of the fractional value;
    generating, via the one or more processors, the transcendental value based on at least the fractional value by summing at least the second portion of the fractional value with at least one of the shifted fractional value and the constant value;
    if the opcode is determined to correspond to the power-of-two operation:
        calculating an integer value from the input value,
        determining based on the input value whether to perform complementing of the integer value and the fractional value, and
        providing the transcendental value as a power-of-two value in response to the input; and
    if the opcode is determined to correspond to the trigonometric operation:
        determining, based on the fractional value, whether to perform at least one of inverting the fractional value and negating the transcendental value, and
        providing the transcendental value as a trigonometric value in response to the input.

2. The method of claim 1, wherein the opcode is determined to correspond to the trigonometric operation, the fractional value corresponds to one of a first quadrant value, a second quadrant value, a third quadrant value, and a fourth quadrant value.

3. The method of claim 2, wherein calculating the fractional value from the input value comprises dividing the input value by a value of two multiplied by pi, and wherein determining at least one of the second portion of the fractional value and the constant value includes determining an angular segment of the unit circle to which the input value corresponds.

4. The method of claim 2, wherein, if the fractional value corresponds to one of the first quadrant value and the third quadrant value, the fractional value is not inverted, and wherein, if the fractional value corresponds to one of the second quadrant value and the fourth quadrant value, the fractional value is inverted.

5. The method of claim 2, wherein if the fractional value corresponds to one of the first quadrant value and the fourth quadrant value, the transcendental value is not negated, and wherein, if the fractional value corresponds to one of the second quadrant value and the third quadrant value, the transcendental value is negated.

6. The method of claim 1, wherein the opcode is determined to correspond to the power-of-two operation, and generating the transcendental value further includes the steps of:
   generating a power-of-two exponent value based on the integer value; and
   concatenating the power-of-two exponent value with a power-of-two fractional value generated from at least the second portion of the fractional value.

7. The method of claim 6, wherein the integer value and the fractional value are complemented when the input value is less than zero.

8. The method of claim 6, wherein the power-of-two exponent value is generated by re-biasing the integer value.

9. The method of claim 1, wherein generating the transcendental value based on at least the fractional value comprises:
   summing the second portion of the fractional value with the shifted fractional value and a first constant value if the first portion of the fractional value corresponds to a first predefined value; and
   summing the second portion of the fractional value with the shifted fractional value and a second constant value if the first portion of the fractional value corresponds to a second predefined value.

10. The method of claim 1, wherein generating the transcendental value based on at least the fractional value comprises:
    summing the second portion of the fractional value with the shifted fractional value without summing any constant value with the fractional value if the first portion of the fractional value corresponds to a first predefined value; and
    summing the second portion of the fractional value with the constant value without summing any shifted fractional value with the portion of the fractional value if the first portion of the fractional value corresponds to a second predefined value.

11. A circuit for generating a transcendental value, comprising:
    logic for determining whether the opcode corresponds to a trigonometric operation or a power-of-two operation;
    logic for calculating at least a fractional value from an input value provided in an instruction;
    logic for determining at least one of a shifted fractional value and a constant Value, wherein the constant value is determined based on at least a first portion of the fractional value, wherein the shifted fractional value is produced by shifting a second portion of the fractional value, wherein the second portion of the fractional value is different from the first portion of the fractional value, and wherein the first and second portions of the fractional value each include one or more, but not all, bits of the fractional value; and
    logic for generating the transcendental value based on at least the fractional value by summing at least the second portion of the fractional value with at least one of the shifted fractional value produced by shifting the portion of the fractional value and the constant value, wherein, if the opcode is determined to correspond to the power-of-two operation, the transcendental value is a power-of-two value, and the logic for generating the transcendental value is configured to:
   calculate an integer value from the input value; and
   determine based on the input value whether to perform complementing of the integer value and the fractional value, and
wherein, if the opcode is determined to correspond to the trigonometric operation, the transcendental value is a trigonometric value and the logic for generating the transcendental value is configured to:
   determine, based on the fractional value, whether to perform at least one of inverting the fractional value and negating the transcendental value.

12. The circuit of claim 11, further comprising:
    logic for determining whether an opcode provided in the instruction corresponds to a trigonometric operation or a power-of-two operation and controlling generating of the transcendental value based on the determination.

13. The circuit of claim 12, wherein, if the opcode is determined to correspond to the trigonometric operation, the fractional value corresponds to one of a first quadrant value, a second quadrant value, a third quadrant value, and a fourth quadrant value.

14. The circuit of claim 13 wherein, if the fractional value corresponds to one of the first quadrant value and the third quadrant value, the fractional value is not inverted, and wherein, if the fractional value corresponds to one of the second quadrant value and the fourth quadrant value, the fractional value is inverted.

15. The circuit of claim 13, wherein if the fractional value corresponds to one of the first quadrant value and the fourth quadrant value, the transcendental value is not negated, and wherein, if the fractional value corresponds to one of the second quadrant value and the third quadrant value, the transcendental value is negated.

16. The circuit of claim 11, wherein the logic for calculating the fractional value from the input value is configured to divide the input value by a value of two multiplied by pi, and wherein determining at least one of the second portion of the fractional value and the constant value includes determining an angular segment of the unit circle to which the input value corresponds.

17. A processor, comprising: at least one execution unit having:
    logic for determining whether an opcode provided in the instruction corresponds to a trigonometric operation or a power-of-two operation and controlling generating of the transcendental value based on the determination;
    logic for calculating at least a fractional value from an input value provided in an instruction;
    logic for determining at least one of a shifted fractional value and a constant Value, wherein the constant value is determined based on at least a first portion of the fractional value, wherein the shifted fractional value is produced by shifting a second portion of the fractional value, wherein the second portion of the fractional value is different from the first portion of the fractional value, and wherein the first and second portions of the fractional value each include one or more, but not all, bits of the fractional value; and
    logic for generating a transcendental value based on at least the fractional value by summing at least the second portion of the fractional value with at least one of the shifted fractional value and the constant value, wherein, if the opcode is a power-of-two operation, the transcendental value is a power-of-two value, and the logic for generating the transcendental value is configured to:
calculate an integer value from the input value; and
determine based on the input value whether to perform complementing of the integer value and the fractional value, and wherein, if the opcode is determined to correspond and to the trigonometric operation, the transcendental value is a trigonometric value, and the logic for generating the transcendental value is configured to:
determine, based on the fractional value, whether to perform at least one of inverting the fractional value and negating the transcendental value.

18. The processor of claim 17, wherein, if the opcode is determined to correspond to the trigonometric operation, the fractional value corresponds to one of a first quadrant value, a second quadrant value, a third quadrant value, and a fourth quadrant value.

19. The processor of claim 18 wherein, if the fractional value corresponds to one of the first quadrant value and the third quadrant value, the fractional value is not inverted, and wherein, if the fractional value corresponds to one of the second quadrant value and the fourth quadrant value, the fractional value is inverted.

* * * * *